July 4, 1944.　　　　J. F. TOLK　　　　2,352,869
SEISMIC SURVEYING
Filed Feb. 23, 1943
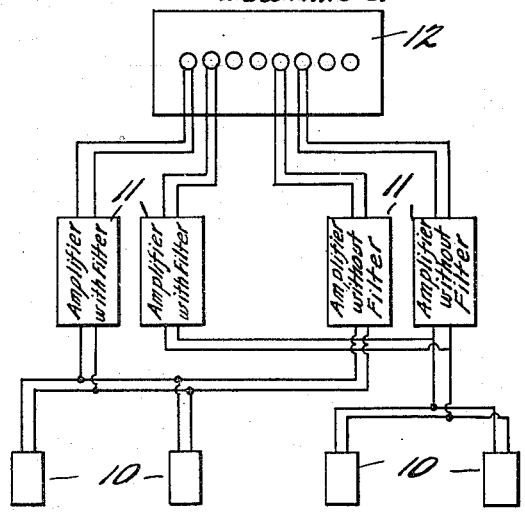
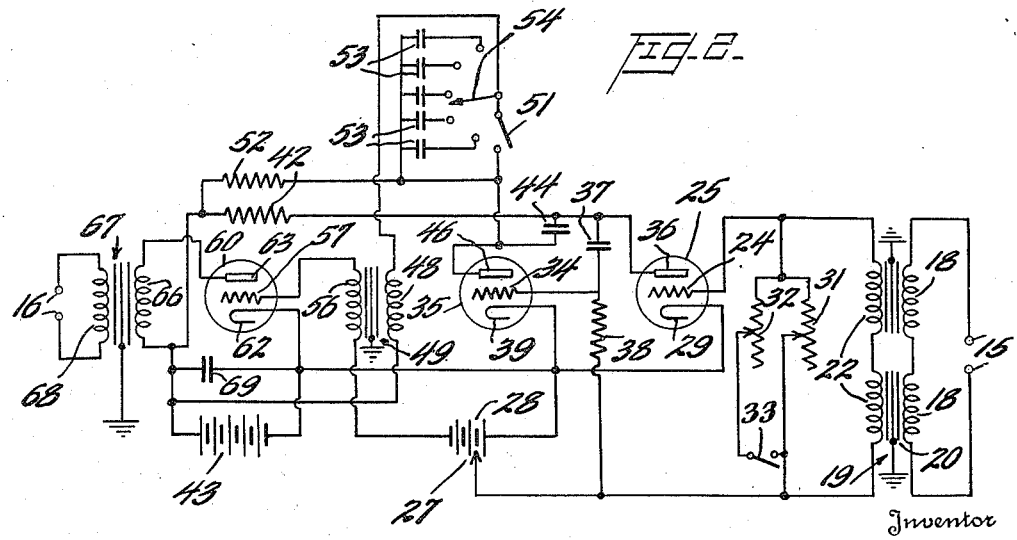
Inventor
John F. Tolk
By Watson, Cole, Grindle & Watson
Attorney Patented July 4, 1944

2,352,869

UNITED STATES PATENT OFFICE 2,352,869

SEISMIC SURVEYING

John F. Tolk, San Antonio, Tex., assignor to Olive S. Petty, San Antonio, Tex.

Application February 23, 1943, Serial No. 476,851

9 Claims. (Cl. 177—352)

This invention relates to methods of and apparatus for conducting seismic surveys for use in connection with geophysical prospecting, and more particularly to apparatus and methods for amplifying and recording the seismic wave trains which have been generated by firing a charge of explosive at a remote point.

Conventional equipment for recording seismic waves includes a device variously called a detector, seismograph, seismometer, geophone, or the like, which is located at a suitable receiving point. In general, these devices comprise a relatively steady mass and a part movable with the earth, these parts supporting electrical elements which are relatively movable thereby, so that electrical wave-form signals are generated on the arrival of seismic waves or impulses at the receiving station. The electrical wave-form energy, which is representative of the received seismic wave trains, is customarily amplified with suitable equipment and fed into a recorder, which usually includes the moving element of a galvanometer, the motion of which is recorded, by suitable optical means, on a sensitized sheet caused to move by clockwork at a substantially fixed rate. Definite time intervals from an appropriate timing device are also recorded on the sheet.

In order to make use of records prepared in this manner, it is essential to determine accurately the time of explosion of the generating charge as well as the instant of arrival of the first wave of each train of seismic impulses, so that the time of travel of the wave trains may be definitely computed. It is especially important to determine the time of travel of the so-called reflected waves, which penetrate the earth to considerable depths and are reflected upwardly from various strata, in order that the depth of these strata may be calculated.

It is therefore the principal object of the invention to provide methods and means whereby the times of arrival of wave trains may be more definitely determined and accurately located on seismic record sheets of the character described. More specifically, it is an object of the invention to feed the energy from each seismometer through two paths, in one only of which is included filtering means for suppressing or reducing frequencies falling outside of a selected band of substantially less width than the range of frequencies ordinarily useful in seismic surveying. The filtered and the unfiltered energy is then separately and simultaneously recorded on a single sensitized strip.

I have discovered that this method is especially helpful in determining the instant of arrival of the first wave of each seismic train, the first part of each train being quite similar in form and amplitude, where as later portions of the train are usually quite dissimilar. This is presumably due to the fact that the filtering action has little effect on the first portion of the train but modifies later portions significantly.

Various other advantages are derived from this method. For example, in the surveying of a considerable area, the frequency of the reflected waves may alter radically from one location to another, and such frequency alteration, quite helpful in the interpretation of the record, is clearly apparent by a comparison of the filtered and unfiltered traces, the latter being little affected by a change in frequency of the wave energy. Again, this method permits the selection of a frequency range for the filtered trace which is especially suited to the location being examined and to the conditions obtaining during the survey. For example, in portions of some areas it is helpful to reject the lower frequencies in order to obtain a clear and workable record, while in other portions of the same area the lower frequencies may facilitate interpretation. Portions of an area may result in excessive ground roll, which may be largely eliminated by proper filtering. Wind conditions may require rejection of the higher frequencies. By means of the present invention I am enabled to select a range of frequencies most favorable to interpretive clarity of the record and at the same time to obtain a substantially unfiltered trace which is useful for purposes of comparison of records obtained from different portions of a given area.

It will be appreciated that the same result cannot be achieved by successive recording of seismic waves with and without filtering action. Such a method not only requires more time and involves greater expense, but it is often impossible to duplicate the wave energy by successive shots, since the earth near the charge may fatigue and cause a change in velocity and frequency of the propagated energy after the first shot.

In the preferred form of my invention, the filtering means is associated with the amplifier, all of the amplifiers being duplicates but being so constructed that they may be employed either for the production of a substantially unfiltered trace or for the production of a trace affording significant filtering action and adjustable to select that band of frequencies best suited to the area of operation and to the prevailing conditions.

Further objects and features of the invention will be apparent from the following description taken in connection with the accompanying drawing in which:

Figure 1 is a diagrammatic view of a surveying system illustrating one method of practicing the invention; and Figure 2 is a wiring diagram of an amplifier suitable for use in the system illustrated in Figure 1.

In Figure 1 there are shown two groups of seismometers 10 which in practice are located at spaced points. The outputs of the seismometers in each group are combined to reduce the effect of unwanted, generally horizontally propagated waves, but for the purpose of the present invention, such a group acts as a single seismometer. Reference hereinafter to one seismometer is therefore intended to embrace such a group, acting as one. Normally, a considerably greater number of seismometers is used, for example eight or ten, the number being limited in the drawing in the interest of simplification. As hereinbefore explained, each of these seismometers converts the seismic energy to electrical wave form energy, and the energy output of each seismometer is passed through two amplifiers 11. One of these amplifiers is so constructed or adjusted as to select and emphasize a desired and limited band of frequencies, whereas the other amplifier, supplied with energy from the same seismometer, is without significant filtering action. The output energy of the two amplifiers is separately recorded in the recorder 12, for example by the application of such energy to separate movable elements of a multiple galvanometer, the displacement of which is simultaneously recorded on a single sensitized moving strip.

If only two seismometers were employed the recorder would thus produce four wave-form traces on the moving strip, two of these traces representing filtered energy, and the remaining two traces representing unfiltered energy. It will of course be appreciated that whenever reference is made herein to unfiltered energy, there is no intention of entirely excluding filtering action since obviously the exclusion or suppression of frequencies falling outside of the useful band, for example 20 to 100 cycles, is highly desirable in any event. The term is used primarily to distinguish from what is referred to herein as filtered energy, in which a band of frequencies falling within and of substantially less width than the useful band of seismic frequencies is favored or emphasized.

Turning now to Figure 2 of the drawing, in which is shown an amplifier capable of adjustment to deliver either filtered or unfiltered energy and to select the frequency range of the filtered energy, it will be observed that the incoming energy from a seismometer applied at the terminals 15 is supplied to the primary windings 18 of a transformer indicated generally at 19, the transformed core 20 being grounded. The secondary windings 22 of the transformer supply a varying potential to the grid 24 of a thermionic valve 25. A suitable bias voltage is applied to the grid 24 by an adjustable tap 27 on a source 28 of grid bias voltage, the positive terminal of the source being connected to the cathode 29 of the valve 25 and the negative tap being returned to the grid through the transformer secondary. Variable resistances 31 and 32, the latter being arranged in series with a switch 33, are shunted across the secondary windings 22 of the transformer 19 for the purpose of regulating the amplitude of energy supplied to the valve 25.

The output of the valve 25 is delivered through resistance coupling to the valve 35. Thus the anode 36 of the valve 25 is connected to the grid 34 of the valve 35 through a coupling condenser 37, a grid resistor 38 being connected between the grid 34 and the cathode 39 of the valve 35, and an anode resistor 42 being connected between the anode 36 of the valve 25 and the positive terminal of a source 43 of anode voltage, the negative terminal of the source 43 being returned to the cathodes 29 and 39.

For the purpose of emphasizing energy within a useful frequency band, the anode circuits of the valves 25 and 35 may be coupled by a condenser 44 of relatively small capacity, whereby only frequencies higher than the desired band are fed back from the anode 46 of the valve 35 in inverse phase relation, the higher frequency energy being thus largely cancelled.

The output of the anode 46 of the valve 35 may be returned through the primary winding 48 of transformer 49, the core of which is grounded, to the positive terminal of the anode source 43, by the closing of a switch 51 arranged in series with these elements. A variable capacitive coupling is provided between the valve 35 and the transformer 49. Thus the switch 51 may be opened, anode voltage being supplied to the anode 46 of the valve 35 through an anode resistor 52. A series of coupling condensers 53 of different capacity are arranged for selective coupling between the anode 46 and the primary 48 of the transformer 49 by a switch 54. By selection of the proper coupling condenser 53, a particularly useful range of frequencies within the desired frequency band may be favored.

The secondary winding 56 of the transformer 49 is connected at one end to the grid 57 of a thermionic valve 60, the other end of the winding being connected to the negative terminal of the source 28 of grid bias voltage. The cathode 62 of the valve 60 is connected to the negative terminal of the source 43 of anode voltage, the positive terminal of the source being connected to the anode 63 of the valve through the primary winding 66 of a transformer 67, the core of which is grounded. The secondary windings 68 of the transformer 67 delivers the energy to the output terminals 16 of the amplifier, either directly or through further amplifying stages, and thence to the recorder. The source 43 of anode voltage for the several valves is shunted by a condenser 69 affording a by-pass for pulsating current.

In the use of the amplifier shown in Figure 2 in the practice of the invention, the amplification of energy without significant filtering action is obtained by closing the switch 51 and opening the switch 54, the effect of the coupling condensers 53 being thereby eliminated, so that the circuit functions as a conventional amplifier. When the amplifier is to be used to deliver filtered energy, switch 51 is opened, and switch 54 is operated to select a condenser 53 of such value that a limited range of frequencies comprised within the useful range is selected and emphasized.

While I have found it desirable to employ the circuit illustrated herein and disclosed in the prior patent to O. S. Petty, No. 2,285,610, granted June 9, 1942, in the practice of my invention, it will be appreciated that other amplifying circuits affording frequency selection or giving band pass filtering action may be employed. Alternatively, the amplifiers need afford in themselves no significant filtering action, the energy derived from the seismometer being passed, either before or after amplification, or at any intermediate stage, through a suitable filtering device to provide the necessary frequency selection, arrangements being provided for the elimination of the filtering action in dealing with that portion of the energy from each seismometer which is used to provide the unfiltered trace. In other words, the invention contemplates broadly the simultaneous recording of two traces representative of energy derived from one seismometer, certain frequencies within the useful range of frequencies being excluded in the production of one only of the two traces.

Having thus described the invention, what is claimed as new and desired to be secured by Letters Patent is:

1. In a method of seismic surveying which involves firing an explosive charge to create seismic waves in the earth, detecting said waves at a plurality of remote points, converting the same to separate electrical wave form signals, and amplifying and recording such signals, the steps which comprise causing the electrical wave form signals from each such point to flow through two separate paths, filtering the signals in one only of such paths to emphasize a restricted band of frequencies, and separately and simultaneously recording the signals flowing in both paths.

2. In a method of seismic surveying which involves firing an explosive charge to create seismic waves in the earth, detecting said waves at a remote point, converting the same to electrical wave form signals, and amplifying and recording such signals, the steps which comprise causing the electrical wave form signals from such remote point to flow through two separate paths, filtering the signals in one only of such paths to emphasize a different band of frequencies, allowing the passage through the other of said paths, without significant attenuation, of all of the useful frequencies, and separately and simultaneously recording the signals flowing in both paths.

3. In a system for use in seismic surveying, the combination with a plurality of seismometers, of a pair of separate amplifying and recording devices receiving energy from each seismometer, each pair acting simultaneously to record two traces representative of the energy output of such seismometer, and a filtering device associated with one only of each pair of amplifying devices, for selecting and emphasizing a restricted band of frequencies in one of said traces.

4. In a system for use in seismic surveying, the combination with a seismometer for converting seismic impulses into electrical wave form energy, of two separate electrical amplifying devices receiving energy from said seismometer and acting simultaneously to amplify such energy, a filtering device responsive to a restricted frequency band associated with one only of said amplifying devices for selecting and emphasizing a predetermined band of frequencies in the energy being amplified, the other of said amplifying devices allowing passage therethrough of all useful seismic frequencies, and two recording devices, each recording device receiving energy from one of said amplifying devices, for separately and simultaneously recording on a single recording base a pair of traces in one only of which is emphasized a restricted frequency band.

5. In a system for use in seismic surveying, the combination with a seismometer, of two separate amplifying and recording devices associated with said seismometer and acting simultaneously to record a plurality of traces representative of the energy output of said seismometer, and a filtering device responsive to a predetermined, restricted frequency band operatively connected with one only of the amplifying devices, for selecting and emphasizing a more limited band of frequencies in one trace than in the other.

6. In a system for use in seismic surveying, the combination with a seismometer, of a pair of separate amplifying and recording devices receiving energy from said seismometer and acting simultaneously to record a pair of traces representative of the energy output of said seismometer, and a filtering device disposed intermediate the seismometer and one only of the recording devices for selecting and emphasizing a limited band of frequencies in one of said traces, the other of said traces being unrestricted as to frequency within the range of useful frequencies.

7. In a system for use in seismic surveying, the combination with a plurality of seismometers, of a pair of separate amplifying and recording devices associated with each seismometer and acting simultaneously to record a pair of traces representative of the energy output of such seismometer, and a filtering device disposed intermediate each seismometer and one only of the recording devices associated therewith for selecting and emphasizing a limited band of frequencies in one trace.

8. In a system for use in seismic surveying, the combination with a seismometer, of a pair of separate amplifying and recording devices associated with said seismometer and acting simultaneously to record a plurality of traces representative of the energy output thereof, one of said amplifying devices being so constructed as to emphasize a limited band of frequencies lying wholly within and of substantially less width than the band of frequencies emphasized by the other of said amplifying devices.

9. In a system for use in seismic surveying, the combination with a seismometer, of a recorder including a pair of recording elements, and means affording separate electrical paths connecting said seismometer with the respective recording elements, one only of said paths including filtering means favoring a band of frequencies of narrow width as compared to the range of useful seismic frequencies, whereby filtered and unfiltered energy derived from one seismometer is recorded separately by said elements.

JOHN F. TOLK.